US007650815B2

(12) United States Patent
Revelis et al.

(10) Patent No.: US 7,650,815 B2
(45) Date of Patent: Jan. 26, 2010

(54) BRAKE ACTUATOR WITH RETAINER FOR RESTRICTING LATERAL MOVEMENT OF LEVER

(75) Inventors: Peter Revelis, Newmarket (CA); Eokchel Ahn, Newmarket (CA); Mark Van Ryswyck, Concord (CA)

(73) Assignee: Ventra Group, Inc., Ontario (CA)

( * ) Notice: Subject to any disclaimer, the term of this patent is extended or adjusted under 35 U.S.C. 154(b) by 520 days.

(21) Appl. No.: 11/349,186

(22) Filed: Feb. 8, 2006

(65) Prior Publication Data

US 2007/0181386 A1 Aug. 9, 2007

(51) Int. Cl.
*G05G 1/04* (2006.01)

(52) U.S. Cl. ........................................................ 74/526

(58) Field of Classification Search ................ 74/473.3, 74/478, 490.12, 490.14, 500.5, 512, 519, 74/523, 526, 527, 529, 532, 533, 535, 577 R
See application file for complete search history.

(56) References Cited

U.S. PATENT DOCUMENTS 2,793,535 A * 5/1957 Stump ......................... 74/152
3,580,104 A 5/1971 Yashiro et al.
4,181,834 A * 1/1980 Kyonomine ............. 200/61.89
4,612,823 A * 9/1986 De Leeuw et al. ............ 74/533
4,872,368 A * 10/1989 Porter ......................... 74/542
5,758,547 A * 6/1998 Smale ......................... 74/516
5,787,761 A * 8/1998 Wang .......................... 74/535
5,950,496 A 9/1999 Rampp
6,073,513 A 6/2000 Huebner
6,202,980 B1 3/2001 Vincent et al.
6,286,389 B1 9/2001 Papadatos
6,648,105 B2 11/2003 Lang et al.
6,718,836 B2 4/2004 Revelis et al.
6,817,264 B2 * 11/2004 Hiura et al. ................... 74/512
6,843,150 B2 1/2005 Djordjevic
6,973,852 B2 * 12/2005 Shin et al. ..................... 74/535

FOREIGN PATENT DOCUMENTS

JP 7-190109 7/1995
JP 09030384 A * 2/1997

* cited by examiner

*Primary Examiner*—Vicky A Johnson
(74) *Attorney, Agent, or Firm*—Pillsbury Winthrop Shaw Pittman LLP

(57) ABSTRACT

The present invention provides for a brake actuator for use in a motor vehicle. In a motor vehicle with one or more brakes activated by a cable system, there is a mounting bracket mounted in the motor vehicle. Movably mounted to the mounting bracket is a lever that can move in brake applying and brake releasing directions, and which is constructed to be connected to the brake cables. The lever applies tension to the brake cables when the lever is moved in the brake applying direction, and releases the tension when moved in the releasing direction. Mounted to either the lever or the mounting bracket is a retainer constructed to engage the other of the lever or the mounting bracket. The retainer acts to restrict the relative lateral movement of the lever and the mounting bracket.

13 Claims, 6 Drawing Sheets

10
12
14
16
18
20
22
24
26
28
30
32
34
36
38
40
42
44
46
48
60
62

12
24
36
32
14
34
16
42
36
44
48

16
50

16
56
54
58
52
62
62
50

16
50

BRAKE ACTUATOR WITH RETAINER FOR RESTRICTING LATERAL MOVEMENT OF LEVER

FIELD OF THE INVENTION

The present invention relates to a brake actuator with a retainer for restricting lateral movement between a lever and a mount bracket.

BACKGROUND OF THE INVENTION

Parking brakes on motor vehicles usually take the form of handbrakes or footbrakes. For handbrakes, the mechanism contains a mounting bracket affixed to the interior floor of a motor vehicle. An actuator lever is rotatably attached to the mounting bracket, allowing the actuator lever to be moved upward from a released position to an engaged position. Typically, a cam is attached to the actuator lever. This cam translates the upward motion of the actuator lever into horizontal motion of the cable which, in turn, engages the rear parking brake of the motor vehicle.

Typically, the actuator lever and the mounting bracket are made of metal. When the actuator lever is released from the engaged position, the actuator lever and the mounting bracket will make metal-to-metal contact as the brake comes to rest in the released position. This contact can create an audible and unpleasant noise. Additionally, when the motor vehicle is moving, vibrations from the road and the engine can translate to vibrations of the entire mechanism, including the mounting bracket and the actuator lever. These vibrations can cause the mounting bracket and the actuator lever to "rattle."

SUMMARY OF THE INVENTION

The present invention provides for a brake actuator for use in a motor vehicle. In a motor vehicle with one or more brakes activated by a cable system, there is a mounting bracket mounted in the motor vehicle. Movably mounted to the mounting bracket is a lever that can move in brake applying and brake releasing directions, and which is constructed to be connected to the brake cables. The lever applies tension to the brake cables when the lever is moved in the brake applying direction, and releases the tension when moved in the releasing direction. Mounted to the lever or the mounting bracket is a retainer constructed to engage the other of the lever or the mounting bracket. The retainer acts to restrict the lateral movement of the lever relative to mounting bracket.

Another aspect of the invention provides a vehicle comprising one or more vehicle brakes, a cable system comprising one or more cables for applying the one or more vehicle brakes, and a brake actuator. The brake actuator comprises a lever movable relative to a fixed structure in brake applying and releasing directions. The lever is connected to the cable system for applying tension to the one or more cables in the applying direction and releasing the tension in the releasing direction. A retainer is provided on one of the lever and the fixed structure. The retainer is constructed to engage the other of the lever and the fixed structure when the lever is moved in the releasing direction to a fully released position and restrict relative lateral movement between the lever and the fixed structure. The fixed structure may be the mounting bracket of the actuator, or it may be some other part, such as a part of the vehicle. For example, the fixed structure could include an element or portion of the ornamental cover used to house the brake actuator.

Other objects, features, and advantages of the present invention will be appreciated from the following detailed description, the accompanying drawings, and the appended claims.

DETAILED DESCRIPTION OF ILLUSTRATED EMBODIMENT OF THE INVENTION

Figure 1:
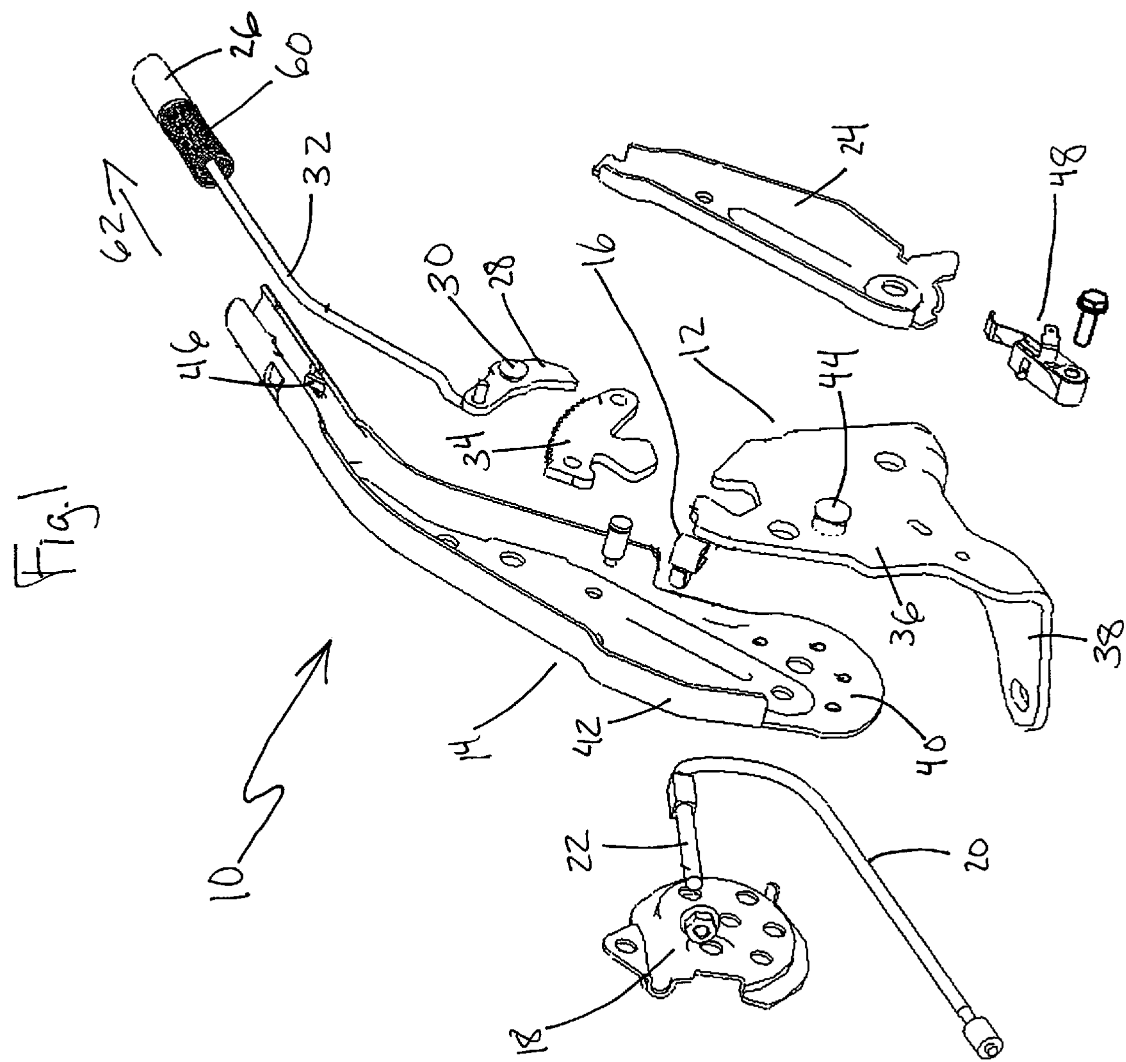
FIG. 1 is an exploded perspective view of the brake actuator.

The figures illustrate a brake actuator 10 constructed to activate the braking mechanism on a motor vehicle. In FIG. 1, the brake actuator 10 has a mounting bracket 12 that is capable of being affixed to the interior floor of a motor vehicle 64. The mounting bracket 12 has a horizontal side section 38 in contact with the floor of the motor vehicle 64 and a vertical bottom section 36. Both the horizontal side section 38 and the vertical bottom section 36 are provided with plurality of holes.

There is also an actuator lever 14, rotatably attached to the mounting bracket 12 at pivot point 44 (defined by a rivet or other suitable structure for establishing a pivotal connection). The actuator lever 14 has a vertical side section 40 and a horizontal top section 42. The vertical side section 40 is provided with a plurality of holes, and is connected to the vertical side section 36 of mounting bracket 12 at pivot point 44. Actuator lever 14 is also provided with spring shoulders 46 which are configured to be engaged by the inner end of spring 60 (discussed below). Mounting bracket 12 and actuator lever 14 can be made from any number of suitable materials, including metal, plastic, strong rubber, composite materials, or any combination thereof.

Affixed to the vertical side section 40 of actuator lever 14 is cam 18. Cam 18 is affixed to the vertical side section 40 of actuator lever 14 such that any motion of the actuator lever 14 about pivot point 44 is directly translated to cam 18. The cam 18 is affixed to actuator lever 14 by rivets extending through holes in the vertical side section 40 of actuator lever 14. Cam 18 is configured to receive threaded rod 22, which is connected to cable 20. As the actuator lever 14 rotates about pivot point 44, the cable 20 wraps around cam 18 and results in tension on cable 20, thereby activating the brake mechanism 66. The threaded rod 22 is threaded so as to allow for adjustment to the tension of cable 20. Cover 24 engages pivot point 44 and moves along with actuation lever 14. The cover 24 may be regarded as part of actuator lever 14, and is attached to the main portion of actuator lever 14 where tie rod 32 is carried. Other arrangements besides a cam may be used for coupling the cable to the lever, and the invention is not limited to the illustrated construction.

The vertical side section 36 of mounting bracket 12 is configured to receive sector 34. Alternatively, vertical side section 36 of mounting bracket 12 and sector 34 can be one piece. Sector 34 is provided with a plurality of teeth on its edge to engage pawl 28. The teeth on sector 34 are directionally disposed so that pawl 28 and the actuator lever 14 may travel in a ratcheting action in only the applying direction with the pawl 28 ratcheting the teeth of sector 34. When the user wishes to move the actuator lever 14 in the releasing direction from an applied position, button 26 must be depressed. Actuator lever 14 is configured to receive button 26 at one end, with spring 60 disposed between the button and the spring shoulders 46. The spring 60 is provided to bias the button in an outward direction 62.

Button 26 is connected to one end of tie rod 32, which is contained within actuator lever 14, and which is connected at the other end to pawl 28. When button 26 is depressed, and spring 60 is compressed and this motion is translated to pawl 28 by tie rod 32. Pawl 28 pivots about pawl pivot 30, causing pawl 28 and the teeth of sector 34 to disengage sufficiently to allow travel of the actuator lever 14 in either direction. Other structures for releasing the pawl, and other position control devices besides a pawl, may be used. The invention is not limited to the construction illustrated in this respect.

The vertical side section 40 of actuator lever 14 is provided with a hole configured to receive retainer 16. Preferably, the hole configured to receive retainer 16 is proximate to the intersection of the vertical side section 40 and the horizontal top section 42 of actuator lever 14.

Figure 2:
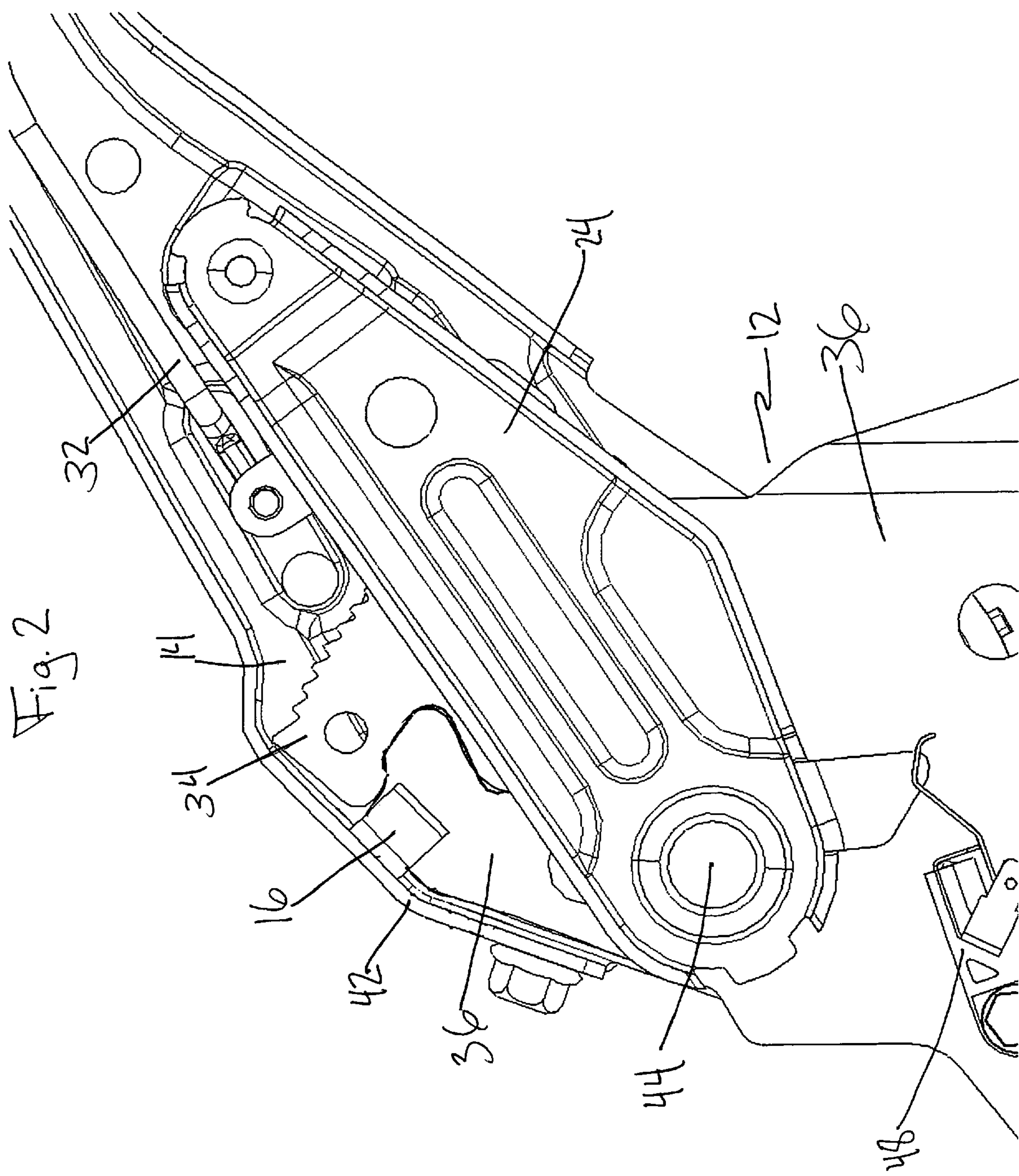
FIG. 2 is side profile of the brake actuator of FIG. 1 in the fully released position.

FIG. 2 is a side view of the brake actuator 10 showing the actuator lever in the fully released position. In the fully released position, the cable's 20 tension is sufficiently low so as to de-activate the brake mechanisms 66 of the motor vehicle 64. Note that retainer 16 is in contact with vertical side section 36 of mounting bracket 12 as well as with the horizontal top portion 42 of actuator lever 14. Retainer 16 is positioned such that it is located at the point of first contact between horizontal top portion 42 of actuator lever 14 and vertical side portion 36 of mounting bracket 12. This placement of retainer 16 allows the retainer 16 to act as a damper between horizontal top portion 42 of actuator lever 14 and vertical side portion 36 of mounting bracket 12.

Figure 3:
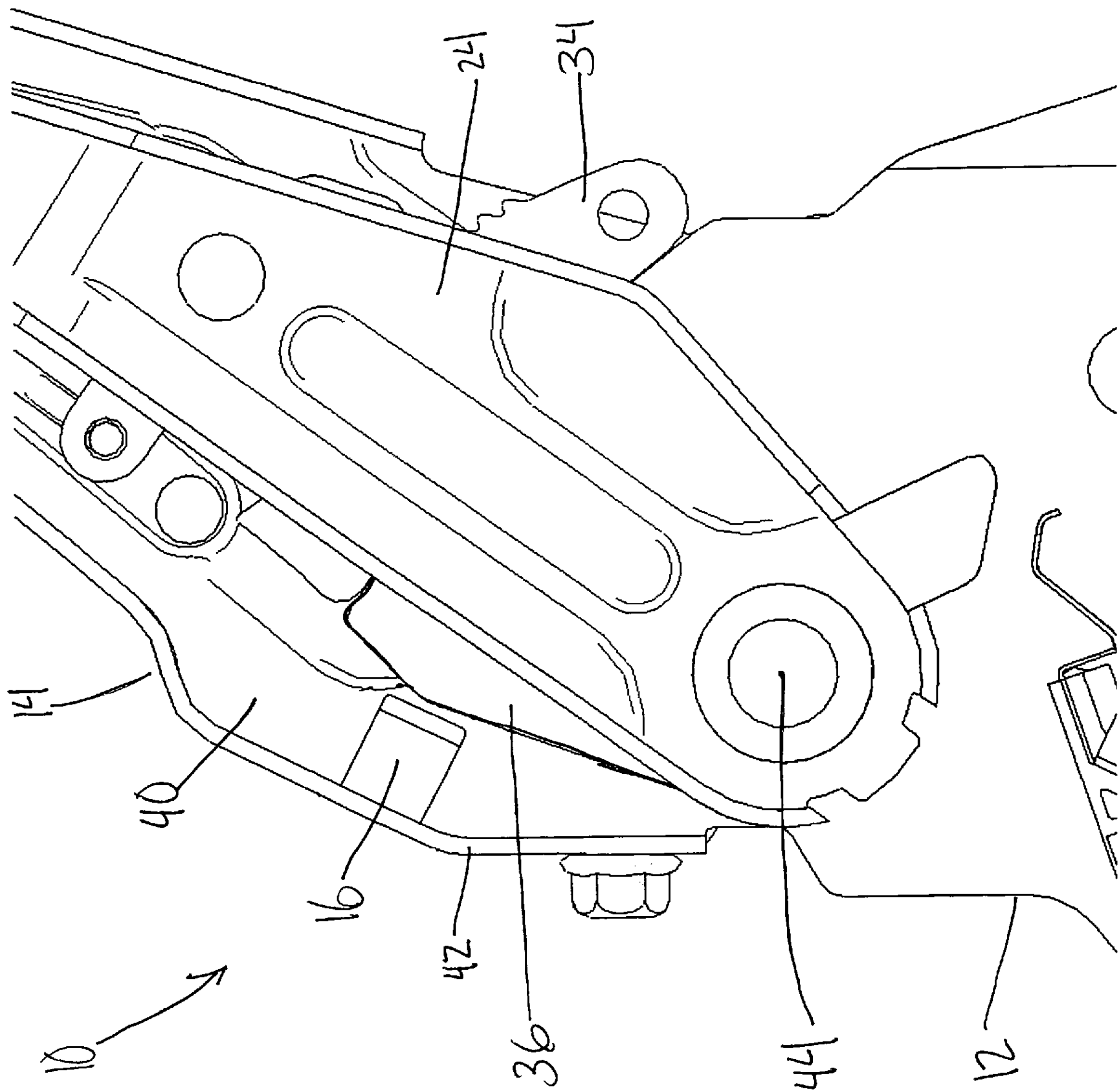
FIG. 3 is a side profile of the brake actuator of FIG. 1 in the engaged position.

FIG. 3 is another side view of brake actuator 10 showing the actuator lever 14 in the engaged position. In the engaged position, sufficient tension is applied to cable 20 to engage the brake mechanisms 66. In the engaged position, retainer 16 moves with the lever 14 and is disengaged from the vertical side section 36 of mounting bracket 12. There is an attachment structure for securing the retainer 16 to the actuator lever 14.

Figure 4:
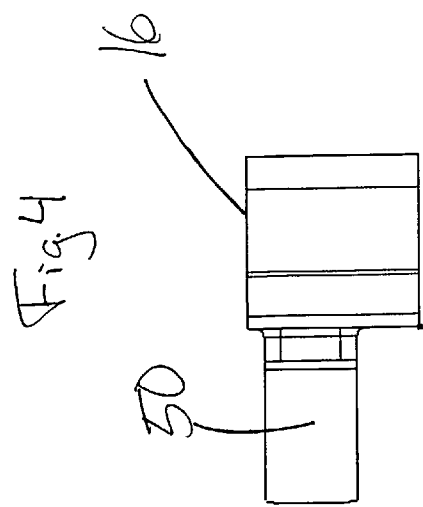
FIG. 4 is a top view of the retainer.
Figure 5:
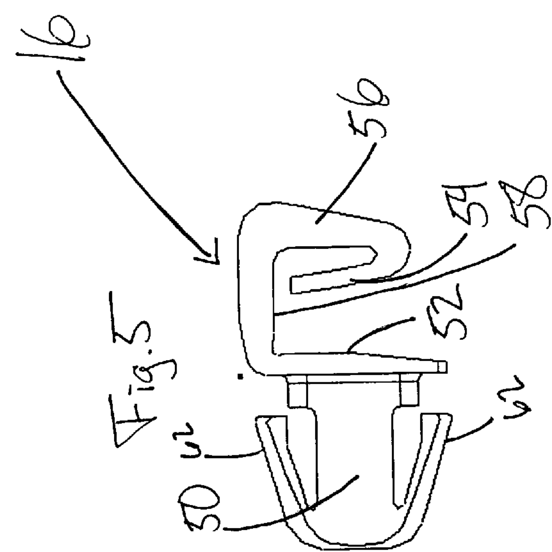
FIG. 5 is a side profile view of the retainer of FIG. 4.
Figure 6:
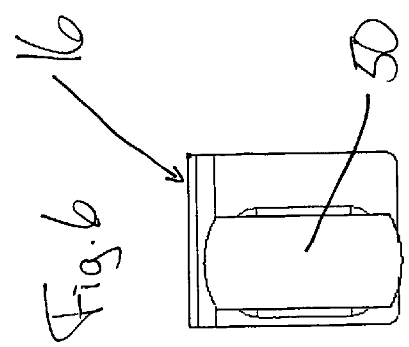
FIG. 6 is a side profile view of the retainer of FIG. 4.

FIG. 4 is a top view of the retainer 16. This view shows an attachment structure for securing the retainer 16 to the actuator lever 14. The attachment structure includes a snap structure 50, which is inserted into a hole disposed on the vertical side wall 40 of actuator lever 14. Snap structure 50 ensures that retainer 16 remain affixed to the actuator lever 14. In FIG. 5, it can be appreciated how the flexible wings 62 compress to allow the snap structure 50 to pass through an appropriate sized hole in only one direction. The wings 62 then flex out to engage the edge portion around the hole and prevent withdrawal. The snap structure 50 allows the retainer 16 to be installed with relative ease.

FIG. 5 is a side view of the retainer 16, and shows first interior wall 52, top wall 58, finger 56, and second interior wall 54. Although retainer 16 could be made of many materials, in one embodiment the retainer 16 is molded from plastic in one integral piece. The retainer 16 is proportioned such that the space between first interior wall 52 and second interior wall 54 is approximately the width of the vertical side section 36 of the mounting bracket 12. Thus, when the actuator lever 14 is in the released position, the retainer 16 will engage and receive the vertical side section 36 of the mounting bracket 12.

Figure 8:
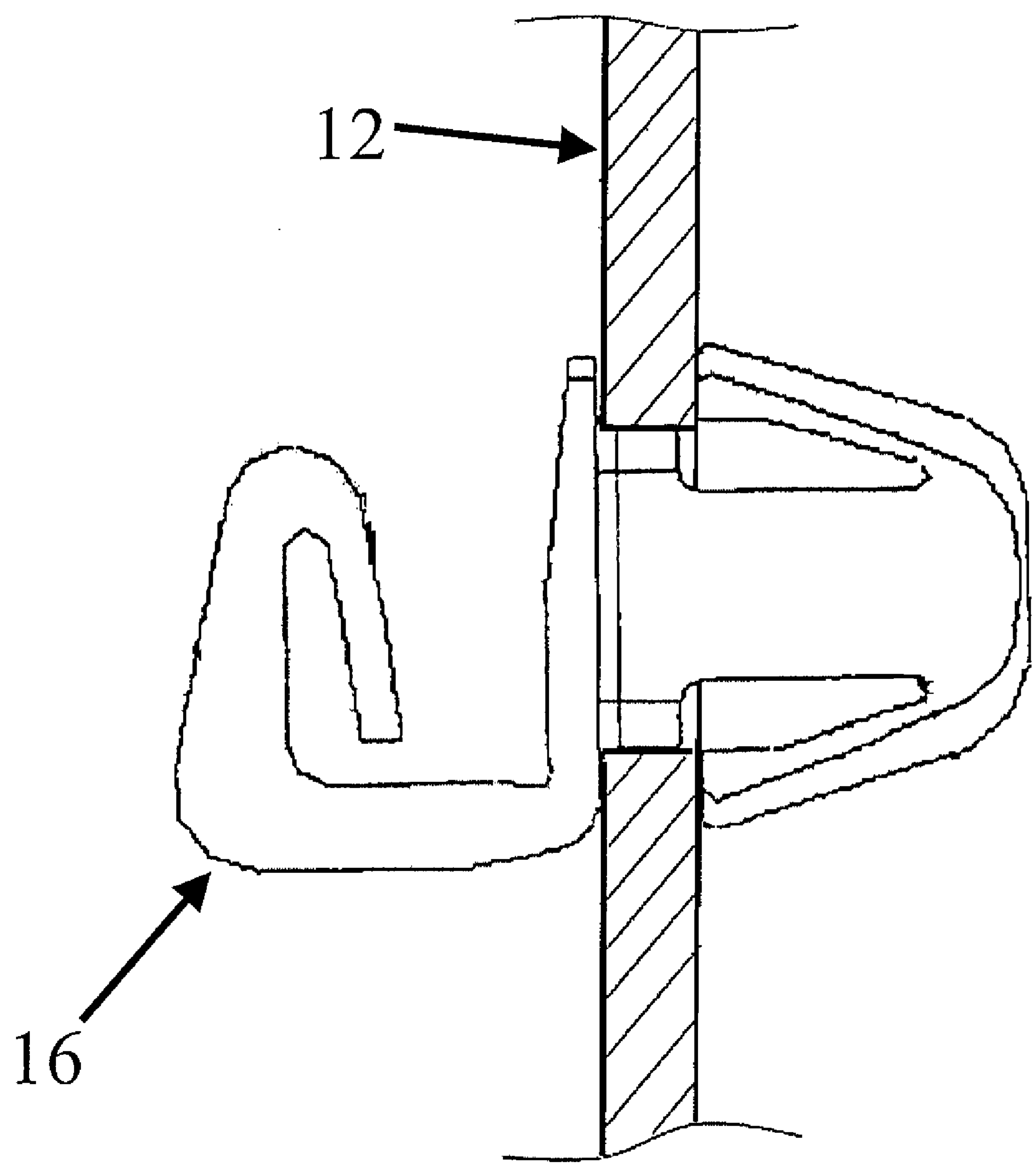
FIG. 8 is a cut-away side profile view according to an alternative embodiment in which the retainer is provided on the mounting bracket.

Although retainer 16 may be affixed to actuator lever 14 by snap structure 50 as described above, other methods of attaching the retainer 16 to actuator lever 14 may be employed. For example, retainer 16 may be riveted to actuator lever 14. Or, in the alternative, if retainer 16 and actuator lever 14 are made from the same material, retainer 16 and actuator lever 16 may be part of the same integral piece or welded together. Retainer 16 may also be press fit into actuator lever 14, or adhesive bonding may be used to join retainer 16 and actuator lever 14. Although exemplary methods of attachment are provided above, it can be appreciated by one skilled in the art that any attachment method is contemplated by the inventors, and this disclosure is in no way intended to limit the scope of the invention. Also, these variations (and any other variations) could be implemented in a construction where the retainer is provided on the mounting bracket 12, for example as illustrated in FIG. 8.

The connection between finger 56 and second interior side wall 54 is flexible and resilient, allowing the second interior side wall 54 to exert a biasing force against the vertical side section 36 of the mounting bracket 12 in the direction of the first interior side wall 52. This will occur when the space between the first interior side wall 52 and the second interior side wall 54 of the retainer 16 is less than the width of the vertical side section 36 of mounting bracket 12. This allows the finger 56 and the second interior side wall 54 to act as a spring to force the mounting plate 12 against the first interior wall of retainer 16, thereby restricting "side lash" (i.e., relative lateral movement) between the lever 14 and the mounting bracket 12. If the retainer 16 is made of plastic, the reduction of side lash will result in a decrease of metal-to-metal contact caused by side lash, thereby reducing the amount of audible "rattle" caused by said motion. However, retainer 16 may also be made from any suitable materials, including spring steel or other metal, strong rubber, composite materials, or any combination thereof, including multi-construction and overmolds.

When actuator lever 14 is moved from an engaged position to the released position, the vertical side section 36 of the mounting bracket will enter into retainer 16 and make contact with top wall 58. The top wall 58 effectively acts as a stop, causing the actuator lever 14 to come to rest in the released position, and will prevent any more motion in that direction. Again, if retainer 16 is made of plastic, the contact between the top wall 58 and the vertical side section 36 of mounting bracket 12 will make less noise than would be the case if the metal lever 14 directly contacted the metal bracket 12.

Ideally, the hole in vertical side section 40 of actuator lever 14 will be of a polygonal shape that matches the shape of snap structure 50. Thus, when snap structure 50 is disposed therein, the retainer 16 will not rotate in the hole.

Figure 7:
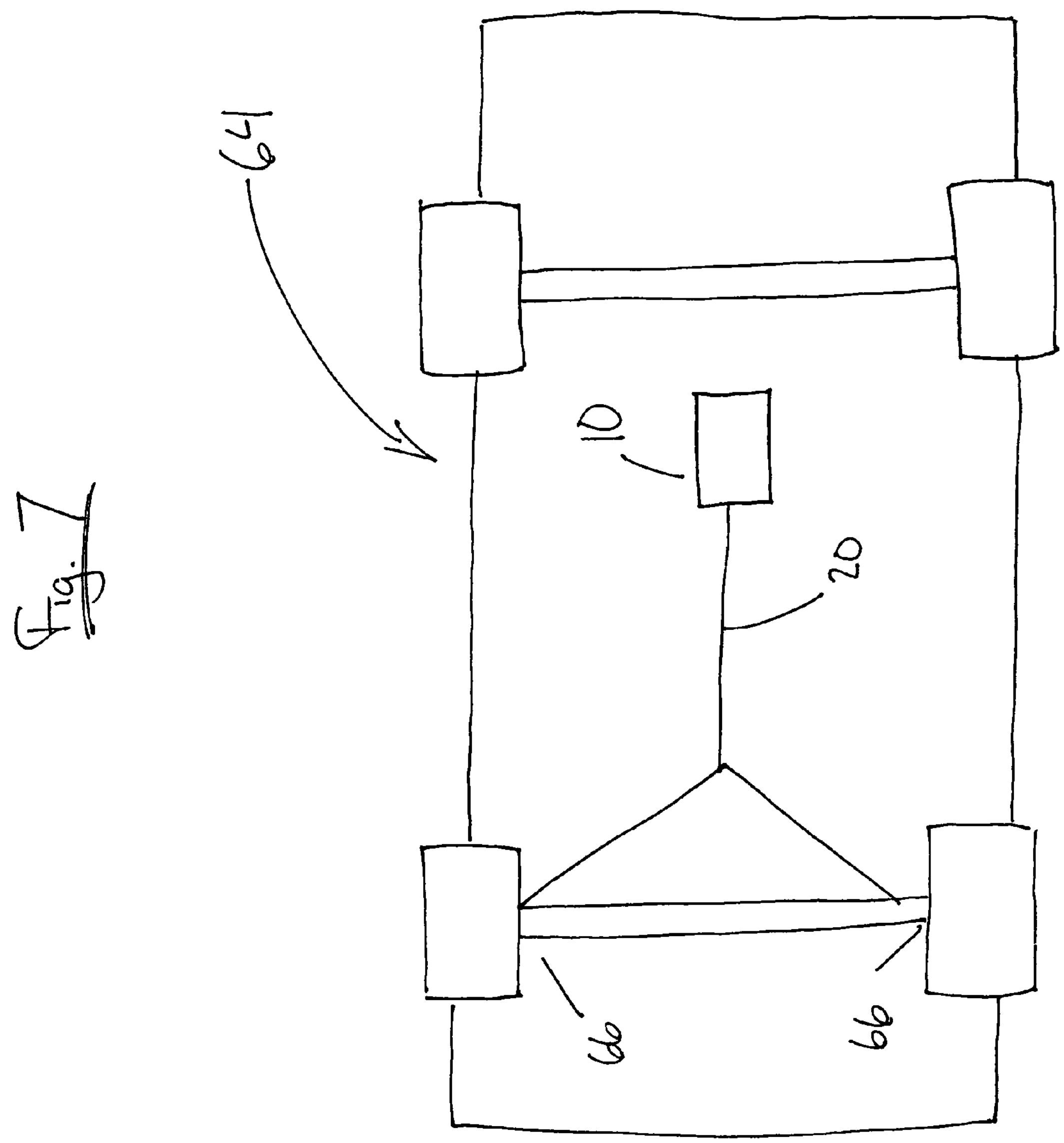
FIG. 7 is a schematic of the brake actuator in a motor vehicle.

FIG. 7 is a schematic of a motor vehicle 64, showing brake actuator 10, cable 20, and brake mechanism 66.

As an alternative, the retainer 16 need not be attached only to the actuator lever 12. In fact, the retainer 16 could be attached to the mounting bracket 12 by orienting the retainer 16 such that it was capable of receiving the actuator lever 14 as the lever traveled from an engaged to a released position. Alternatively, retainer 16 could be attached to the cover 24 such that retainer 16 engages mounting bracket 12 when the cover 24 and the actuator lever 14 travel from any engaged to a released position.

Although a handbrake has been described and shown, the use of footbrakes (i.e., a pedal-based, foot-operated actuator) in the industry is well known. Accordingly, the retainer 16 may also be used in a similar fashion in a footbrake. The specific details of a footbrake need not be detailed herein. Reference may be made to U.S. Pat. No. 6,397,468 as an example of such a device. This reference is incorporated in the present application in its entirety by reference. Likewise, the handbrake embodiments of the invention are not limited to the specific construction illustrated. Reference for other suitable construction may be made to U.S. Pat. Nos. 6,718,836, 6,286,389, and 6,202,980, each of which is incorporated herein in its entirety.

The foregoing illustrated embodiment has been provided solely for the purpose of illustrating the structural and functional principles of the present invention, and it is not intended to be limiting. To the contrary, the present invention is intended to encompass all variables, modifications, alterations, substitutions, and equivalents within the spirit and scope of the following claims.

What is claimed:

1. A brake actuator for use in a motor vehicle having one or more vehicle brakes actuable by a cable system comprising one or more cables, comprising:

a mounting bracket constructed to be mounted in said motor vehicle;

a lever movably mounted to the mounting bracket for movement in brake applying and brake releasing directions, the lever being constructed to be connected to the cable system for applying tension to the one or more cables in the applying direction and releasing the tension in the releasing direction; and a retainer provided on one of the lever and the mounting bracket, the retainer being constructed to engage the other of the lever and the mounting bracket when the lever is moved in the releasing direction to a fully released position and restrict relative lateral movement with respect to the releasing direction between the lever and the mounting bracket, wherein the retainer has a pair of spaced apart walls for receiving a portion of the other of the lever and the mounting bracket therebetween, wherein a space between the spaced apart walls is slightly narrower than a width of the other of the lever and the mounting bracket, and wherein at least one of the walls is resiliently flexible to permit ingress of the other of the lever and the mounting bracket into the space, the resilient flexibility applying a biasing force to engage the walls against the other of the lever and the mounting bracket.

2. A brake actuator for use in a motor vehicle having one or more vehicle brakes actuable by a cable system comprising one or more cables, comprising:

a mounting bracket constructed to be mounted in said motor vehicle;

a lever movably mounted to the mounting bracket for movement in brake applying and brake releasing directions, the lever being constructed to be connected to the cable system for applying tension to the one or more cables in the applying direction and releasing the tension in the releasing direction; and a retainer provided on one of the lever and the mounting bracket, the retainer being constructed to engage the other of the lever and the mounting bracket when the lever is moved in the releasing direction to a fully released position and restrict relative lateral movement with respect to the releasing direction between the lever and the mounting bracket, wherein the retainer is attached to the lever.

3. A brake actuator for use in a motor vehicle having one or more vehicle brakes actuable by a cable system comprising one or more cables, comprising:

a mounting bracket constructed to be mounted in said motor vehicle;

a lever movably mounted to the mounting bracket for movement in brake applying and brake releasing directions, the lever being constructed to be connected to the cable system for applying tension to the one or more cables in the applying direction and releasing the tension in the releasing direction; and a retainer provided on one of the lever and the mounting bracket, the retainer being constructed to engage the other of the lever and the mounting bracket when the lever is moved in the releasing direction to a fully released position and restrict relative lateral movement with respect to the releasing direction between the lever and the mounting bracket, wherein the retainer is attached by a portion of the retainer extending through a hole in the one of the lever and the mounting bracket.

4. The brake actuator of claim 3, wherein the hole and the portion of the retainer extending through the hole are non-circular to prevent rotation of the retainer.

5. The bracket actuator of claim 3, wherein the hole is provided on the lever and the retainer is attached to the lever.

6. The brake actuator of claim 4, wherein the retainer has a pair of spaced apart walls for receiving a portion of the other of the lever and the mounting bracket there between.

7. A motor vehicle comprising:

one or more vehicle brakes;

a cable system comprising one or more cables for actuating the one or more vehicle brakes; and a brake actuator comprising:

a lever movable relative to a fixed structure in brake applying and releasing directions, the lever being connected to the cable system for applying tension to the one or more cables in the applying direction and releasing the tension in the releasing direction; and a retainer provided on one of the lever and the fixed structure, the retainer being constructed to engage the other of the lever and the fixed structure when the lever is moved in the releasing direction to a fully released position and restrict relative lateral movement with respect to the releasing direction between the lever and the fixed structure, wherein the fixed structure is a mounting bracket of the brake actuator, the lever being movably mounted to the mounting bracket for movement in the applying and releasing directions, and wherein the retainer has a pair of spaced apart walls for receiving a portion of the other of the lever and the mounting bracket therebetween, wherein a space between the spaced apart walls is slightly narrower than a width of the other of the lever and the mounting bracket and wherein at least one of the walls is resiliently flexible to permit ingress of the other of the lever and the mounting bracket into the space, the resilient flexibility applying a biasing force to engage the walls against the other of the lever and the mounting bracket.

8. A motor vehicle comprising:

one or more vehicle brakes;

a cable system comprising one or more cables for actuating the one or more vehicle brakes; and a brake actuator comprising:

a lever movable relative to a fixed structure in brake applying and releasing directions, the lever being connected to the cable system for applying tension to the one or more cables in the applying direction and releasing the tension in the releasing direction; and a retainer provided on one of the lever and the fixed structure, the retainer being constructed to engage the other of the lever and the fixed structure when the lever is moved in the releasing direction to a fully released position and restrict relative lateral movement with respect to the releasing direction between the lever and the fixed structure, wherein the fixed structure is a mounting bracket of the brake actuator, the lever being movably mounted to The mounting bracket for movement in the applying and releasing directions, and wherein the retainer is attached to the lever.

9. A motor vehicle comprising:

one or more vehicle brakes;

a cable system comprising one or more cables for actuating the one or more vehicle brakes; and a brake actuator comprising:

a lever movable relative to a fixed structure in brake applying and releasing directions, the lever being connected to the cable system for applying tension to the one or more cables in the applying direction and releasing the tension in the releasing direction; and a retainer provided on one of the lever and the fixed structure, the retainer being constructed to engage the other of the lever and the fixed structure when the lever is moved in the releasing direction to a fully released position and restrict relative lateral movement with respect to the releasing direction between the lever and the fixed structure, wherein the fixed structure is a mounting bracket of the brake actuator, the lever being movably mounted to the mounting bracket for movement in the applying and releasing directions, and wherein the retainer is attached by a portion of the retainer extending through a hole in the one of the lever and the mounting bracket.

10. The vehicle according to claim 9, wherein the hole and the portion of the retainer extending through the hole are non-circular to prevent rotation of the retainer.

11. The vehicle according to claim 10, wherein the retainer has a pair of spaced apart walls for receiving a portion of the other of the lever and the mounting bracket there between.

12. The vehicle according to claim 9, wherein the hole is provided on the lever and the retainer is attached to the lever.

13. A brake actuator for use in a motor vehicle having one or more vehicle brakes actuable by a cable system comprising one or more cables, comprising:

a mounting structure;

a lever movably mounted to the mounting structure for movement in brake applying and brake releasing directions, the lever being constructed to be connected to the cable system for applying tension to the one or more cables in the applying direction and releasing The tension in the releasing direction; and a retainer constructed to engage the lever and the mounting structure when the lever is moved in the releasing direction to a fully released position and restrict relative movement between the lever and the mounting structure in a direction lateral to the releasing direction when the lever is moved to the fully released position, wherein the retainer has a pair of spaced apart walls with an opening therebetween;

wherein the retainer is constructed such that a portion of the brake actuator is disposed in the opening when the lever is moved into the fully released position; and wherein the retainer is constructed such that the portion is not disposed in the opening when the lever is moved a predetermined distance away from the fully released position, wherein a space between the spaced apart walls is slightly narrower than a width of the other of the lever and the mounting structure and wherein at least one of the walls is resiliently flexible to permit ingress of the other of the lever and the mounting structure into the space, the resilient flexibility applying a biasing force to engage the walls against the other of the lever and the mounting structure.

* * * * *